United States Patent [19]
Benner

[11] Patent Number: 6,035,983
[45] Date of Patent: Mar. 14, 2000

[54] POWER CORD DISPENSING SYSTEM

[76] Inventor: Peter D. Benner, 556 Mallard Dr., Chalfont, Pa. 18914

[21] Appl. No.: 09/065,148

[22] Filed: Apr. 23, 1998

[51] Int. Cl.[7] .................................................. H02G 11/00
[52] U.S. Cl. ..................................... 191/12.2 R; 191/12.4
[58] Field of Search ............................ 191/12 R, 12.2 R, 191/12.4, 12.2 A; 242/370, 397, 404, 404.3, 406

[56] References Cited

U.S. PATENT DOCUMENTS

| | | | |
|---|---|---|---|
| 121,135 | 11/1871 | Straffin | 242/404 |
| 2,247,868 | 7/1941 | Beasley | 191/12.2 R |
| 2,868,504 | 1/1959 | Minty | 242/397 |
| 2,912,525 | 11/1959 | Ures | 191/12.2 R |
| 3,698,656 | 10/1972 | Ballenger | 242/404 |
| 5,361,879 | 11/1994 | Lin | 191/12.4 |
| 5,679,925 | 10/1997 | Dilley | 242/404 |

*Primary Examiner*—Mark T. Le

[57] ABSTRACT

A dispensing apparatus is provided including a housing with a retracting spool mounted therein for selectively retracting a power cord through an opening formed in the housing. Also included is a cleaning brush situated within the opening for cleaning the power cord upon the retracting and dispensing thereof.

8 Claims, 2 Drawing Sheets

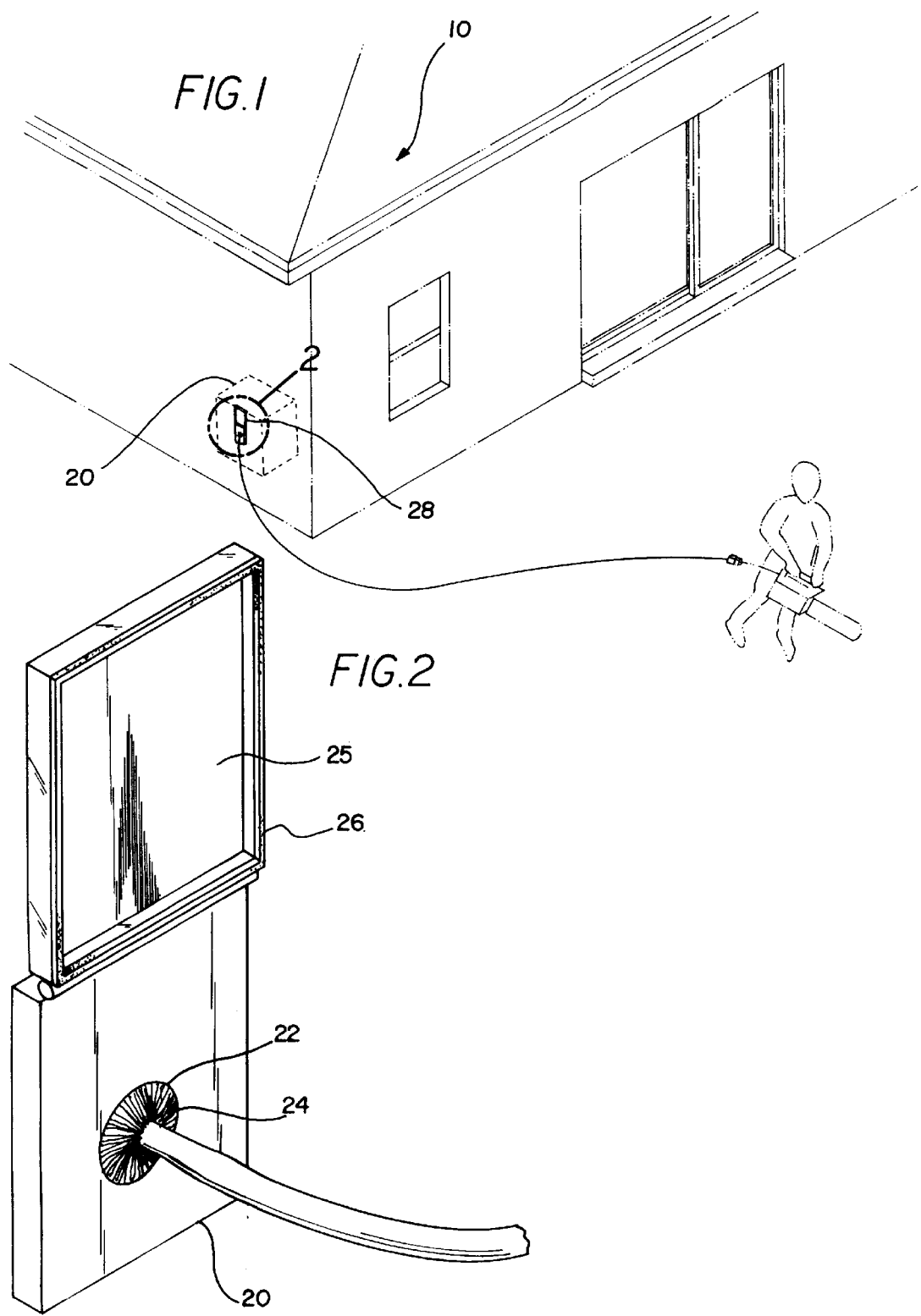

POWER CORD DISPENSING SYSTEM

BACKGROUND OF THE INVENTION

1. Field of the Invention

The present invention relates to retracting power cord assemblies and more particularly pertains to a new power cord dispensing system for allowing the convenient use of electrical appliances.

2. Description of the Prior Art

The use of retracting power cord assemblies is known in the prior art. More specifically, retracting power cord assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art retracting power cord assemblies include U.S. Pat. No. 4,725,697; U.S. Pat. No. 5,535,960; U.S. Pat. No. Des. 294,450; U.S. Pat. No. 4,842,108; U.S. Pat. No. 4,499,341; and U.S. Pat. No. 5,590,749.

In these respects, the power cord dispensing system according to the present invention substantially departs from the conventional concepts and designs of the prior art, and in so doing provides an apparatus primarily developed for the purpose of allowing the convenient use of electrical appliances.

SUMMARY OF THE INVENTION

In view of the foregoing disadvantages inherent in the known types of retracting power cord assemblies now present in the prior art, the present invention provides a new power cord dispensing system construction wherein the same can be utilized for allowing the convenient use of electrical appliances.

The general purpose of the present invention, which will be described subsequently in greater detail, is to provide a new power cord dispensing system apparatus and method which has many of the advantages of the retracting power cord assemblies mentioned heretofore and many novel features that result in a new power cord dispensing system which is not anticipated, rendered obvious, suggested, or even implied by any of the prior art retracting power cord assemblies, either alone or in any combination thereof.

To attain this, the present invention generally comprises a pair of vertically oriented dove-tail brackets. Each of such brackets has a pair of countersunk bores formed therein for being screwably coupled to an inner face of a vertical recipient surface, or wall, of a home or business. For reasons that will soon become apparent, each bracket further includes a widened bottom. Next provided is an interior housing with a square configuration having a top face, a bottom face, a front face, a rear face and a pair of side faces, thereby defining an interior space. The front face of the interior housing has a pair of vertically oriented parallel dove tail slots formed therein for releasably receiving the brackets. As such, the interior housing rests on the widened bottoms of the brackets. During use, the front face of the interior housing resides on the inner face of the vertical recipient surface. Associated therewith is an exterior housing including an open rear face mounted on an exterior face of the vertical recipient surface opposite the interior housing. A front face of the exterior housing is equipped with a circular cut out formed therein. A periphery of the cut out has a plurality of bristles coupled thereto and extended inwardly therefrom for covering the cut out. The front face of the exterior housing further includes a lid with a periphery having an inwardly extending lip integrally coupled thereto. As shown in FIG. 2, such inwardly extending lip is equipped with a rubber seal formed thereon. The lid is pivotally coupled at a top edge thereof over the front face of the exterior housing for selectively covering the same during use. Next provided is a cord assembly including a horizontally oriented spool rotatably coupled between the side faces of the interior housing. The cord assembly has a spring associated therewith. Further, a cord of the cord assembly includes an inboard end which is coupled to the spool and further electrically connected to a power source. An outboard end of the cord has a female adapter. In use, the outboard end of the cord is situated through a bore formed in the rear face of the interior housing, an aperture formed in the vertical recipient surface, and the cut out of the exterior housing for being selectively dispensed. Lastly, a toggle switch is mounted on the top face of the housing adjacent to the rear face thereof. The toggle switch is connected between the cord and the power source for selectively precluding power from being supplied to the female adapter.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power cord dispensing system apparatus and method which has many of the advantages of the retracting power cord assemblies mentioned heretofore and many novel features that result in a new power cord dispensing system which is not anticipated, rendered obvious, suggested, or even implied by any of the prior art retracting power cord assemblies, either alone or in any combination thereof.

It is another object of the present invention to provide a new power cord dispensing system which may be easily and efficiently manufactured and marketed.

It is a further object of the present invention to provide a new power cord dispensing system which is of a durable and reliable construction.

An even further object of the present invention is to provide a new power cord dispensing system which is susceptible of a low cost of manufacture with regard to both materials and labor, and which accordingly is then susceptible of low prices of sale to the consuming public, thereby making such power cord dispensing system economically available to the buying public.

Still yet another object of the present invention is to provide a new power cord dispensing system which provides in the apparatuses and methods of the prior art some of the advantages thereof, while simultaneously overcoming some of the disadvantages normally associated therewith.

Still another object of the present invention is to provide a new power cord dispensing system for allowing the convenient use of electrical appliances such as garden appliances and electric vehicles while reducing electric shock hazards.

Even still another object of the present invention is to provide a new power cord dispensing system that includes a housing with a retracting spool mounted therein for selectively retracting a power cord through an opening formed in the housing. Also included is a cleaning brush situated within the opening for cleaning the power cord upon the retracting and dispensing thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the present invention.

FIG. 2 is a close up perspective view of the present invention.

DESCRIPTION OF THE PREFERRED EMBODIMENT

Figure 3:
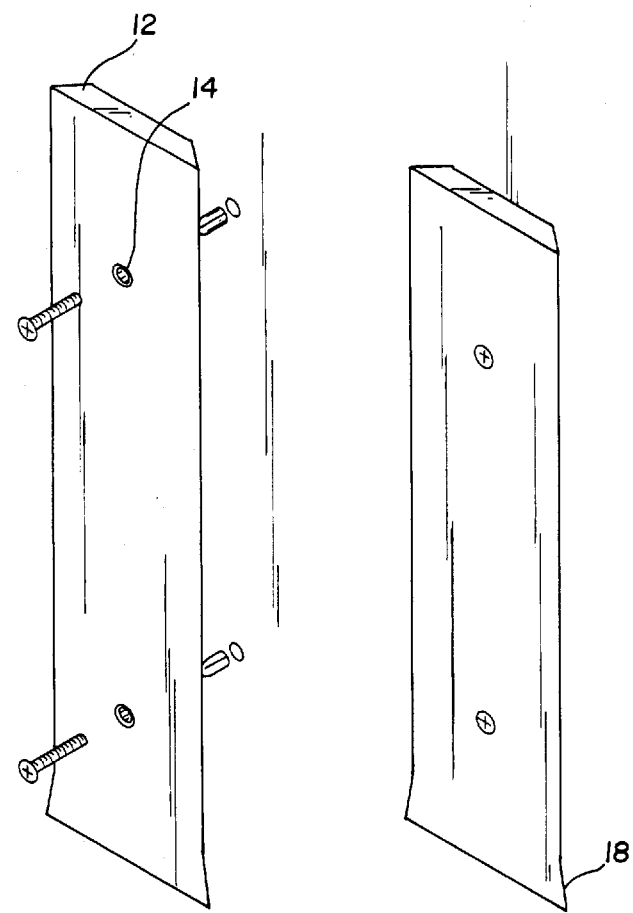
FIG. 3 is a perspective view of the brackets of the present invention.
Figure 4:
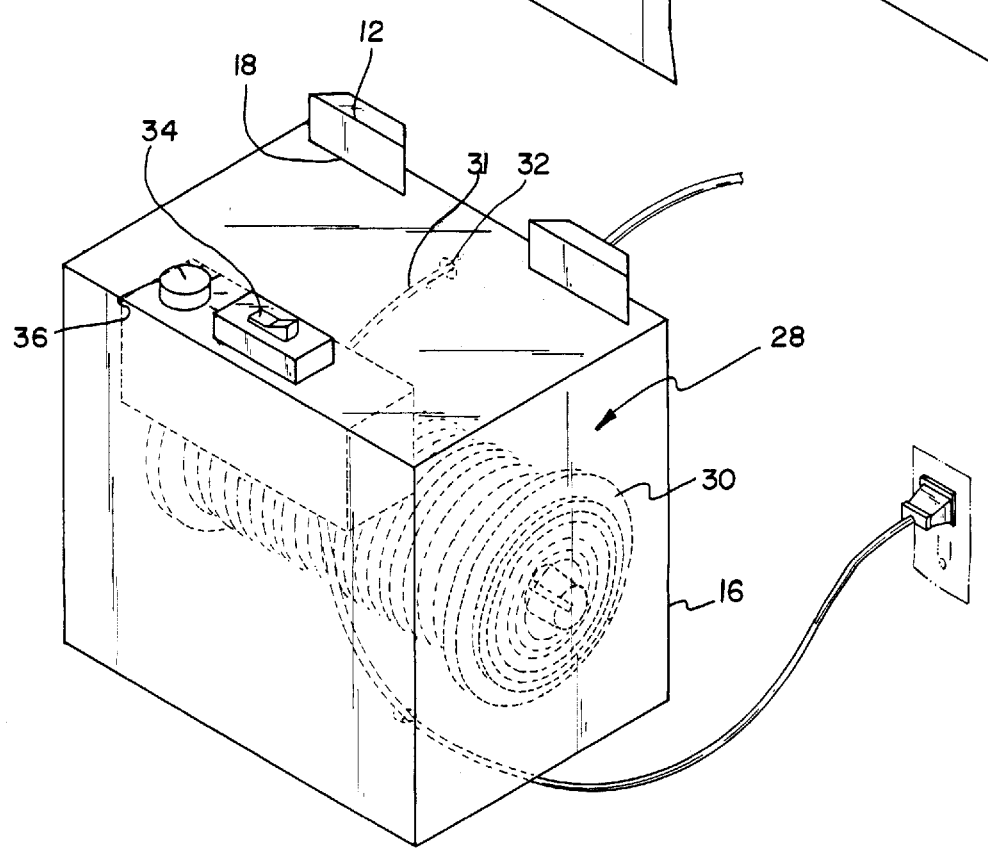
FIG. 4 is a perspective view of the present invention mounted via the brackets shown in FIG. 3.

With reference now to the drawings, and in particular to FIGS. 1 through 4 thereof, a new power cord dispensing system embodying the principles and concepts of the present invention and generally designated by the reference numeral 10 will be described.

The present invention, designated as numeral 10, includes a pair of vertically oriented dove-tail brackets 12. Each of such brackets has a pair of countersunk bores 14 formed therein for being screwably coupled to an inner face of a vertical recipient surface, or wall, of a home or business. For reasons that will soon become apparent, each bracket further includes a widened bottom.

Next provided is an interior housing 16 with a square configuration having a top face, a bottom face, a front face, a rear face and a pair of side faces, thereby defining an interior space. The front face of the interior housing has a pair of vertically oriented parallel dove tail slots 18 formed therein for releasably receiving the brackets. As such, the interior housing rests on the widened bottoms of the brackets. Further, the front face of the interior housing resides on the inner face of the vertical recipient surface.

Associated therewith is an exterior housing 20 with a size that is much smaller than that of the interior housing. The exterior housing includes an open rear face mounted on an exterior face of the vertical recipient surface opposite the interior housing. A front face of the exterior housing is equipped with a circular cut out 22 which has a diameter of about 1–2 inches. A periphery of the cut out has a plurality of bristles 24 coupled thereto and extended inwardly therefrom for covering the cut out. Further, the bristles are ideally cut at unique lengths to afford an X-shaped opening at a central extent thereof.

The front face of the exterior housing further includes a lid 25 with a periphery having an inwardly extending lip integrally coupled thereto. As shown in FIG. 2, such inwardly extending lip is equipped with a rubber seal 26 formed thereon. The lid is pivotally coupled at a top edge thereof over the front face of the exterior housing for selectively covering the same during use.

Next provided is a cord assembly 28 including a horizontally oriented spool 30 rotatably coupled between the side faces of the interior housing. The cord assembly has an unillustrated retractable spring associated therewith. Further, a cord 31 of the cord assembly includes an inboard end which is coupled to the spool and further electrically connected to a power source of any desired power application (i.e. 115 or 220). An outboard end of the cord has a female adapter. It should be noted that the cord may be equipped with any desired length. As an option, one of the faces of the interior housing may be equipped with an access door for allowing the repair of the cord assembly.

In use, the outboard end of the cord is situated through a bore 32 formed in the rear face of the interior housing, an aperture formed in the vertical recipient surface, and the cut out of the exterior housing for being selectively dispensed. Preferably, the aperture formed in the vertical recipient surface has a sleeve mounted therein. Further, it should be understood that the spring associated with the spring assembly is configured similar to that of a retracting assembly in the retractable blind art. As such, the cord may be dispensed a predetermined amount, locked in place and tugged to effect retracting.

A toggle switch 34 is mounted on the top face of the housing adjacent to the rear face thereof. The toggle switch is connected between the cord and the power source for selectively precluding power from being supplied to the female adapter.

Further options include a timer 36 for precluding the supply of power to the female adapter after the cessation of a predetermined amount of time. This may be accomplished by the dial shown in FIG. 4. Still yet another option may include a circuit breaker mounted on the cord adjacent to the inboard end thereof. In an alternate embodiment, the foregoing principles may be applied in the construction of a garden hose retracting apparatus.

In yet another alternate embodiment, the dove tails slots may be formed on the front face of the interior housing instead of the rear face. As such, the interior housing may be used without the exterior housing for dispensing the cord within an interior of the home or business.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power cord dispensing apparatus comprising, in combination:

a pair of vertically oriented dove-tail brackets each having a pair of countersunk bores formed therein for being screwably coupled to an inner face of a vertical recipient surface, each bracket further including a widened bottom;

an interior housing with a square configuration having a top face, a bottom face, a front face, a rear face and a pair of side faces thereby defining an interior space, the front face having a pair of vertically oriented parallel dove tail slots formed therein for releasably receiving the brackets such that the interior housing rests on the widened bottoms thereof, wherein the front face of the interior housing resides on the inner face of the vertical recipient surface;

an exterior housing including an open rear face mounted on an exterior face of the vertical recipient surface and a front face with a cut out formed therein with a periphery having a plurality of bristles coupled thereto and extending inwardly therefrom for covering the cut out, the front face of the exterior housing further including a lid with a periphery having an inwardly extending lip integrally coupled thereto with a rubber seal formed thereon, the lid pivotally coupled at a top edge thereof over the front face of the exterior housing for selectively covering the same;

a cord assembly including a horizontally oriented spool rotatably coupled between the side faces of the interior housing within the interior space thereof and having a spring associated therewith, the cord including an inboard end coupled to the spool and further electrically connected to a power source and an outboard end with a female adapter coupled thereto, wherein the outboard end of the cord is situated through a bore formed in the rear face of the interior housing, an aperture formed in the vertical recipient surface, and the cut out of the exterior housing for being selectively dispensed; and a toggle switch mounted on the top face of the interior housing adjacent to the rear face thereof, the toggle switch connected between the cord and the power source for selectively precluding power from being supplied to the female adapter.

2. A dispensing apparatus comprising:

a housing with a retracting spool mounted therein for selectively retracting an elongated flexible member through an opening formed in the housing; and cleaning means situated in the opening for cleaning the elongated flexible member upon the retracting and dispensing thereof;

wherein the housing is an interior housing mounted to an interior face of a vertical recipient surface; and wherein an exterior housing is mounted to an exterior face of the vertical recipient surface opposite the interior housing.

3. A dispensing apparatus as set forth in claim 2 wherein the cleaning means includes a plurality of bristles.

4. A dispensing apparatus as set forth in claim 2 wherein the elongated flexible member includes a power cord and a switch is included for selectively cutting off power to an appliance connected to the power cord.

5. A dispensing apparatus as set forth in claim 2 wherein the elongated flexible member includes a power cord and further included is a timer for allowing the supply of power to an appliance connected to the cord for a predetermined amount of time.

6. A dispensing apparatus comprising:

a housing with a retracting spool mounted therein for selectively retracting an electrical power supply cord through an opening formed in the housing; and cleaning means situated in the opening for cleaning the electrical power supply cord upon the retracting and dispensing thereof;

wherein the housing has an interior housing mounted in an interior of a vertical recipient surface; and wherein the housing has an exterior housing mounted to an exterior face of the vertical recipient surface opposite the interior housing portion.

7. A dispensing apparatus as set forth in claim 6 wherein the cleaning means includes a plurality of bristles.

8. A dispensing apparatus as set forth in claim 6 additionally comprising a switch selectively cutting off power to an appliance connected to the power supply cord.

* * * * *